United States Patent [19]

Kirchmayer

[11] Patent Number: 4,505,256
[45] Date of Patent: Mar. 19, 1985

[54] SOLAR COLLECTOR AND ABSORBER

[76] Inventor: Hermann Kirchmayer, D-8121 Antdorf, Fed. Rep. of Germany

[21] Appl. No.: 486,925

[22] Filed: Apr. 20, 1983

[30] Foreign Application Priority Data

Apr. 21, 1982 [DE] Fed. Rep. of Germany ....... 3214843
Nov. 12, 1982 [DE] Fed. Rep. of Germany ....... 3241925

[51] Int. Cl.³ ................................................ F24J 3/02
[52] U.S. Cl. .................................... 126/422; 126/437; 126/443; 126/449
[58] Field of Search ............... 126/419, 421, 422, 432, 126/435, 437, 443, 444, 446, 447, 449, 450; 165/18

[56] References Cited

U.S. PATENT DOCUMENTS 4,184,481  1/1980  Tornquist ............................ 126/422
4,257,403  3/1981  Chevalier ........................... 126/449
4,301,786  11/1981  Kirchmayer ...................... 126/450 X

FOREIGN PATENT DOCUMENTS

2932799  3/1981  Fed. Rep. of Germany ...... 126/422
3048499  7/1982  Fed. Rep. of Germany .
1594711  8/1981  United Kingdom ................ 126/422

Primary Examiner—Margaret A. Focarino
Attorney, Agent, or Firm—Holman & Stern

[57] ABSTRACT

A dual mode solar collector and absorber wherein a channel is afforded which may be variably connected to a high temperature reservoir and to a low temperature reservoir having the improvement of disposing the upper side of the channel to form a chamber which is in contact with the surrounding air only when the temperature is less than a predetermined value.

19 Claims, 7 Drawing Figures

SOLAR COLLECTOR AND ABSORBER

BACKGROUND OF THE INVENTION

1. Field of the Invention

This invention relates to a device for converting solar energy into heat.

2. Description of the Prior Art

In a device previously developed by the applicant (Ger. Offenlengungsschrift No. 3 048 499) both the channel facing the sun and the perpendicularly directed channel have covers. It turns out that to recover a given amount of heat with such a device one needs either a relatively large number of collector elements or very large elements.

The problem underlying the present invention is to refine the abovementioned device so that the same output may be obtained with substantially less base area for the collector elements.

SUMMARY OF THE INVENTION

The above problem is solved by the following invention.

A device for converting solar energy into heat, comprising a solar collector having a plurality of collector elements which can be mounted on a support surface, coupled together, and connected to a heat transfer fluid circuit, each of which collector elements is comprised of a first heat transfer fluid channel which faces the sun and is associated with a circulation pump, and each of which collector elements may further be comprised of a second channel which is oriented perpendicularly to the first channel and is in contact with the surrounding air, whereby the channel which faces the sun, (in a first operating mode of said channel in which it operates as a collector), is connected to a branch containing a high temperature reservoir, and (in a second operating mode in which it operates as an absorber), is cut off from the first branch by means of a controlled reversing valve when the temperature of the circulating heat transfer fluid is less than a predetermined minimum temperature, as measured by means of a temperature sensor, and being thus cut off, is connected to a second branch containing a low temperature reservoir. In particular, the improvement of this invention is characterized in that the upper side of the first channel (which faces the sun), is disposed below a light-transmitting cover, and forms the boundary of a chamber in conjunction with said cover, which is in contact with the surrounding air only when the temperature is less than a predetermined value.

The inventive refinement makes it possible not only to achieve the optimum conversion of radiation to heat during sunshine, but also, during periods when there is no usable irradiation (due to weather conditions or the time of day), the invention enables the first channel to be usefully employed as an absorber of heat from air flowing over it surface. The result is an extremely compact device which enables savings of about 500 liters of heating oil per square meter of base space. Thus, only a relatively small collector surface is required to achieve an appreciable saving of heating oil—a surface of a size which is quite inconspicuous, in contrast to the large surface required for commercially available devices for mounting on roofs or the like. Thus, the refinement is accompanied by a noteworthy esthetic improvement as well.

It has proven to be particularly advantageous if the first channel is associated with a valve as will be described below.

When the temperature falls below a predetermined value the valve opens, so that the surrounding air now flows along the channel and some of its heat can be given up to said channel.

As a further refinement, when the first channel is operating as an absorber, the air in contact with the channel is cooled by a relatively cold heat transfer fluid which is supplied to the channel from a low temperature reservoir. The relatively more dense, heavier air thus produced flows along the channel and exits from the chamber through a slot near the channel. The relatively warmer surrounding air enters the chamber through a slot located at some distance from the channel and flows upward into the region of the transparent cover. Thus, despite the fact that the chamber is closed on top, when the channel is being operated as an absorber the necessary air exchange takes place. By taking into account the solar irradiation intensity on the one hand and the external air temperature on the other, it is ensured that the switchover from the low temperature reservoir branch to the high temperature reservoir branch (and vice versa) will be made under the optimal heating conditions for the heat transfer fluid. In the first case the brief stopping of the pumps is sufficient for the channel and the air in the chamber to be heated until said air reaches a temperature at which it is distinctly lighter than the surrounding air and can no longer spontaneously flow out of the chamber.

It is not necessary to open the upper closure of the chamber when the first channel is operating as an absorber in this embodiment, since other means are provided for the necessary air circulation, namely via the slot arrangement, and since in addition when the transition is made from absorber operation to collector operation the brief stopping of the circulation pumps results in a stopping of the air column in the chamber and the rapid heating of said air column.

This result can be achieved in simple fashion by time-dependent stopping of the pumps; however, more precise results are achieved via a preferred embodiment of the invention. In this preferred embodiment, the temperature difference which triggers the restarting of the pumps can be achieved more quickly by a sudden large energy input than by a slow increase in the irradiation energy. This provides a particularly advantageous means of adjustment to the conditions at hand.

In a particularly advantageous embodiment the output of the circulation pump is controlled such that the temperature difference (which depends on the reservoir temperature) is maintained as long as the product of the heat recovery and the flow throughput rate is greater than the value which would be achievable in heat-pump operation.

The collector elements used have, in customary fashion, a plastic base which supports the channel. If, as is normally the case, the channel rests directly on the base with one of its sides, then when the channel is operating as an absorber the heat exchange between the air circulating in the chamber and the chanel takes place only on the upper side of the channel. In a further refinement of the invention a particularly efficient heat exchange can be achieved by providing a narrow secondary chamber between the channel and the base, which secondary chamber (when the channel is operating as an absorber) promotes air exchange by means of increased air circulation. The secondary chamber has its outlet at its lower end, with delivery into the slot which is near the chamber (there being two slots, one near to the chamber and one more distant from it).

In another embodiment an advantageous insulation of the chamber with respect to the exterior has been achieved, whereby there is a reduction of the heat loss through the transparent cover during operation of the channel as a collector when the stationary air column is being heated.

Alternatively, the transparent cover may be one wherein the parallel cover plates form a guide channel for the surrounding air which enters through the slot distant from the channel to pass into the upper chamber region, where it flows upward through the two channel surfaces as heat is removed from it, and finally leaves through the slot which is close to the channel.

BRIEF DESCRIPTION OF THE DRAWINGS

Additional advantages and features of the invention will be seen from the following description, and from the drawings, which are expressly incorporated herein, particularly with regard to any features of the drawings which are not described in the text.

DESCRIPTION OF THE PREFERRED EMBODIMENTS

Figure 1:
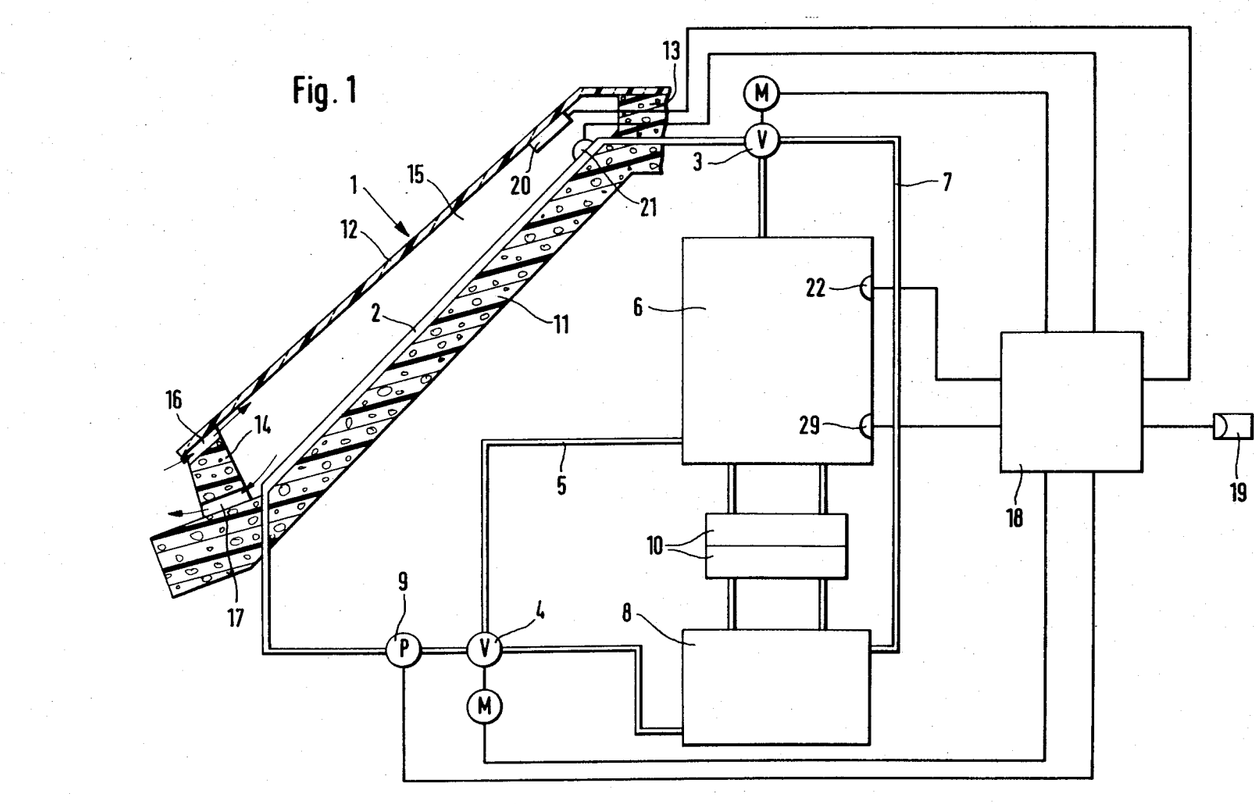
FIG. 1 is a schematic of the inventive device.

FIG. 1 illustrates the inventive device schematically in the simplest possible embodiment, namely with only a single collector element 1 having its heat transfer fluid channel 2 directly connected via first reversing valve 3 and second reversing valve 4 to either a first branch 5 containing a high temperature reservoir 6 or a second branch 7 containing a low temperature reservoir 8—rather than said collector element having its heat transfer fluid channel connected to other similar collector elements. A heat transfer fluid circulating pump 9 is included in the length of conduit between the channel 2 and the reversing valve 4. The low temperature reservoir 8 is linked (thermally) to the high temperature reservoir 16 via a heat pump 10.

Channel 2 of the collector element 1 is mounted on an insulating plastic base 11. A light-transmitting cover 12 is disposed at a distance over the channel 2. Said cover rests on an upper projection 13 and a lower projection 14 of the plastic base 11. The upper projection 13 provides the top closure of the chamber 15 bounded by the cover 12 and the channel 2. There are two slots in the lower projection 14, which slots communicate with the bottom end of said chamber: the first slot 16 is at a distance from the channel, and the second slot 17 is close to the channel.

Adjoining the plastic base 11 with channel 2, which base 11 is inclined at an angle of 45° to 60° to the horizontal, there is another base (not shown in FIG. 1) which runs perpendicularly to base 11 with respect to the horizontal and is for a second channel (also not shown in FIG. 1) which is in contact with the surrounding air.

Associated with the illustrated collector element 1 is a control device 18 which receives the measurement of the external temperature taken with the aid of a first temperature sensor 19 and converts it into electrical signals of appropriate magnitude. It performs the same function with respect to the measurement of the intensity of radiated energy incident on the channel 2, which measurement is made by a photocell 20 mounted under the cover 12. The control device also collects other data and processes it for use in controlling the apparatus: the temperature measured by a second temperature sensor 21 associated with the channel 2, and that measured by a third temperature sensor 22 disposed in the high temperature reservoir 6.

The control function is accomplished as follows: The control device 18 converts the quantities furnished by the measurement of the external temperature and the intensity of the radiant energy incident on the channel 2 into electrical signals of appropriate magnitude and sums these signals. As soon as the sum exceeds a predetermined value, the control 18 turns off the circulation pump until such time as the difference between the measurement signal from the second temperature sensor 21 associated with channel 2 and that from the third temperature sensor 22 disposed in the high temperature reservoir 6 exceeds a predetermined value. At that time the controller, via reversing valves 3 and 4, causes a switchover from the second branch 7 (containing the low temperature reservoir 8) to the first branch 5 (containing the high temperature reservoir 6). When the sum of the electrical signals corresponding to the external temperature and the incident radiant energy is less than the predetermined signal value, the control device causes the reversing valves 3 and 4 to switch back over to the second branch 7 containing the low temperature reservoir 8.

When the channel 2 is operating as an absorber, with the channel connected to the low temperature reservoir 8, the air in the immediate vicinity of the channel 2 is cooled. Due to its greater density, the cooled air flows downward in the manner indicated by the arrows in FIGS. 2 and 3, for example, and exits from the chamber 15 through the second slot 17. A corresponding volume of fresh air enters the chamber in the direction of the arrows, through the slot 16. When the intensity of the radiant energy incident on the channel 2 increases to an appropriate level, the control device 18 causes the circulation pump 9 to stop, which brings about accelerated heating of the heat transfer fluid present in the channel 2 and of the air present in the chamber 15. The flow of said air also practically ceases. In particular, since said air is lighter than the surrounding air, its circulation stops and thus the exchange of air through slots 16 and 17 ends. As soon as the above-mentioned temperature difference between the measurements of temperatures taken by the second and third sensors 21 and 22 is reached, the control device causes the reversing valves 3 and 4 to switch over so that the first branch 5 with the high temperature reservoir 6 is opened up to flow from the collector. At the same time, the circulation pump 9 restarts (also due to the action of the control device), so that channel 2 is now acting as a collector. This mode of operation is continued until the initially mentioned signal sum, which corresponds to the measured external temperature and the measured intensity of the radiant energy incident on the channel, falls below the triggering signal value which is preset in the control device 18.

Figure 2:
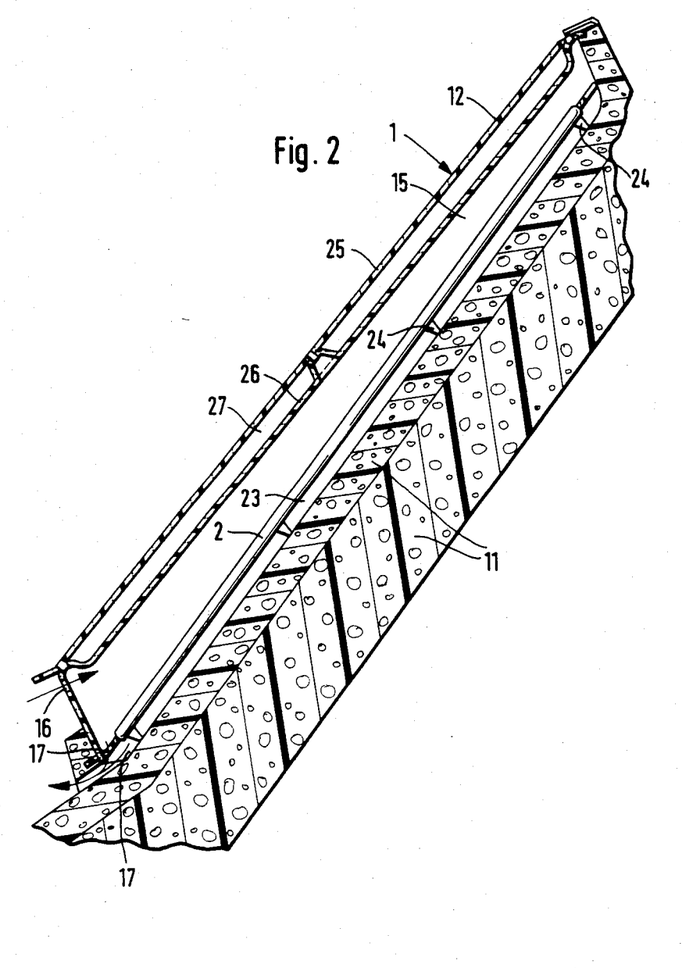
FIG. 2 is a vertical cross-section through a first embodiment of a collector element used in the device.
Figure 3:
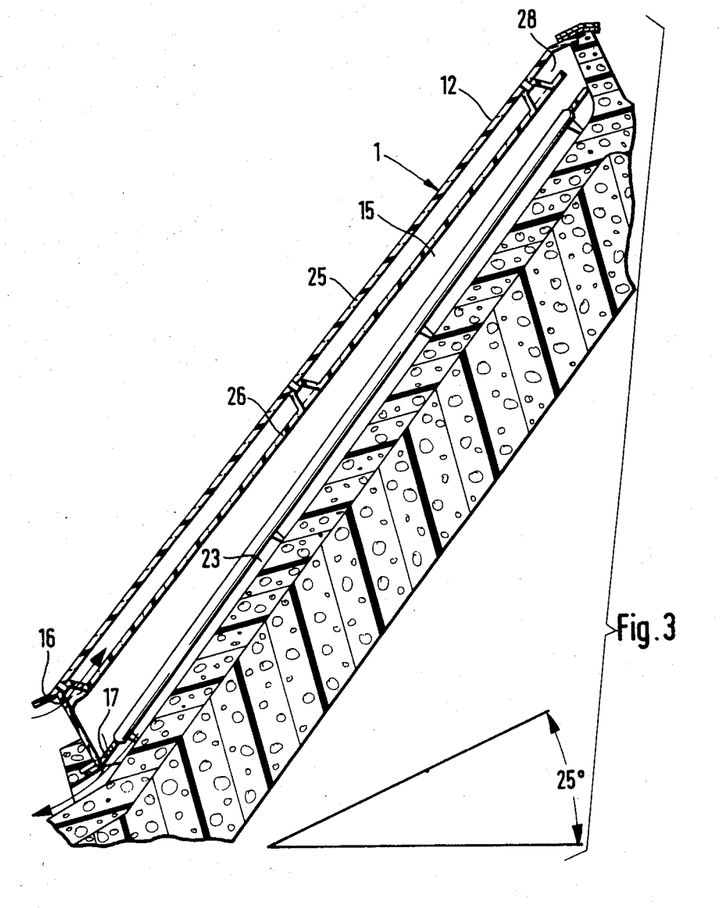
FIG. 3 is a vertical cross-section through a modified embodiment of the collector element of FIG. 2.

FIGS. 2 and 3 show modifications of the embodiment of the collector element 1 of FIG. 1, wherein a narrow or shallow secondary chamber 23 is provided between the channel 2 and the base 11, which chamber promotes air exchange via increased air circulation when channel 2 is operating as an absorber. In this connection, narrow legs or supports 24 are provided on the channel 2 or base 11 to support the one against the other and form lower chamber 23. The outlet of lower chamber 23 at its lower end feeds into the second slot 17 which is near to the chamber.

In the two embodiments of FIGS. 2 and 3, respectively, the transparent cover 12 is comprised of outer cover sheet 25 and inner cover sheet 26 which run generally parallel to each other at a distance apart. In the embodiment of FIG. 2 these are joined in the edge region to form a closed space 27. In the embodiment of FIG. 3 the lower edges of the cover sheets 25 and 26 form the first slot 16, which is at a distance from the channel; and at their top edge they form an opening 28 which opens out into the chamber 15.

It is seen from the drawings that in all embodiments the cross-section of the chamber 15 between the cover 12 and the channel 2 decreases toward the upper closed end.

In order to prevent overheating in the summer, the high temperature reservoir may be provided with a safety thermostat 29 (shown in FIG. 1) connected to the control device 18, whereby when a temperature of, e.g., 90° C. is reached the reversing valves 3 and 4 are actuated, to connect the second branch 7 (having the low temperature reservoir 8) to the channel 2 which is operating as a collector. In geographic regions in which there is a hazard of extremely high temperatures, there can be a variation of the flow circuit shown in FIG. 1, in which there is an additional setting of reversing valves 3 and 4 controlled by safety thermostat 29 whereby both reservoirs 6 and 8 are bypassed.

Figure 4:
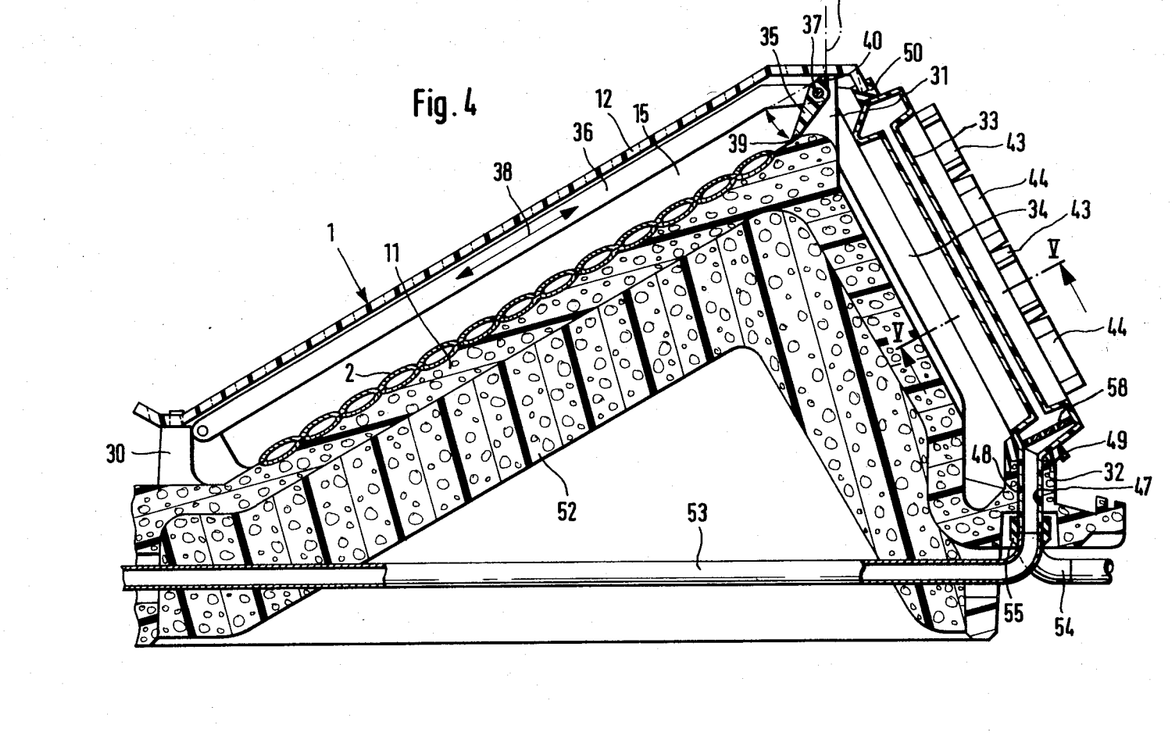
FIG. 4 is a cross-section through one half of a further-modified collector element according to the invention.

In the embodiment shown in FIG. 4 the heat transfer fluid channel 2 of the collector element 1 is mounted on a base 11 of a foam plastic material about 10 mm thick, preferably an integral polyurethane foam, having projections 30, 31 and 32. This base 11 has two frame regions at approximately right angles to each other. At a distance from (and generally parallel to) the second frame region a second channel 33 is attached (to said second frame region), which channel 33 is also preferably of a plastic material. The transparent cover 12 associated with the first channel 2, which cover is preferably of a transparent acrylic material, is mounted on the projections 30 and 31, and along with the upper end of the channel 2 forms the boundary of the chamber 15. To the side, i.e. in planes approximately parallel to the plane of the Figure, the cover 12 merges into side boundary walls (not shown) which are directed toward the base 11. The lower edge of the cover 12 is bent upward to form a hopper-shaped inlet between neighboring projections 30. (In FIG. 4 only the projection toward the viewer is shown). In the opposite edge region the cover 12 is bent over toward the second channel 33, thus forming a link between the chamber 15 and the third chamber 34 located under the second channel 33. Underneath the bent-over part of the cover 12 is a damper 35 which is controlled and works in combination with the heat transfer channel 2, depending on the temperature, to control the available flow area between channel 2 and the cover. The damper is connected to a control element which operates as a function of the temperature, which element may be in the form of, e.g., a bimetallic element. In the example illustrated the control element is comprised of a bar 36 which is pivotably connected on one end to the damper 35. As is seen from FIG. 4, the damper 35 id disposed over the highest point of the heat transfer channel 2. It is in the form of a transverse plate or strip which is swingably mounted on a pivot 37 in the neighborhood of one of its longitudinal edges. The bar 36 is pivotably connected to the damper in a linkage which is eccentric to the pivot 37, namely with the linkage point located below pivot 37. The other end of the bar 36 is attached to the projection 30. When heated it expands in the direction of arrow 38 and guides the damper 35 into the closed position shown in FIG. 4. Since the damper is comprised of an elastic plastic material, its edge 39 may become substantially deformed in the closed position, depending on the degree of expansion of the bar 36. The damper 35 has a flap 40 on its opposite end, which flap rests against the cover 12 when the damper is in the closed position. In particularly windy geographical locations, the collector element 1 may also be furnished with a second controlled damper disposed at the hopper-shaped inlet to the chamber 15.

Figure 5:
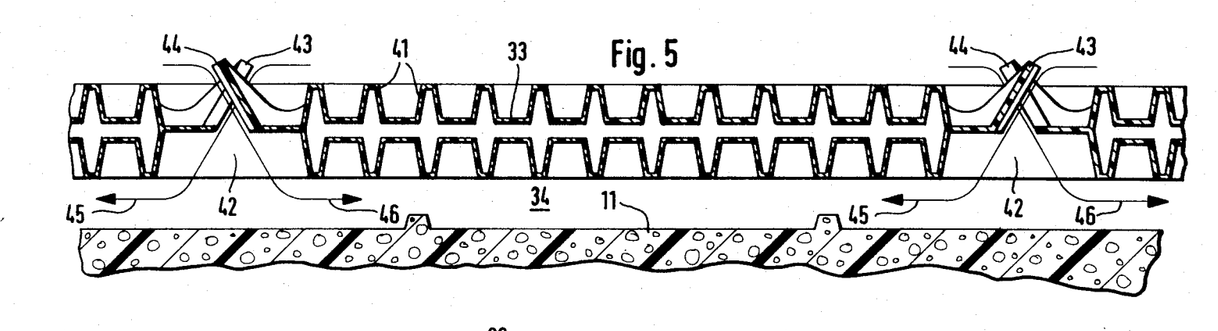
FIG. 5 is a cross-section through the line V—V in the absorber channel region of the collector element of FIG. 4.

As is seen from FIG. 4 in conjunction with FIG. 5, the second channel 33 is supplied with a plurality of fins 41 running in the direction of flow, as well as slots 42 through which the third chamber 34 underneath the channel communicates with the surrounding air. Associated with each of the slots 42 there are vane surfaces 43 and 44 which project toward the surroundings exterior to the second channel 33, which vane surfaces serve to deflect air flowing perpendicularly to the slots 42 so that it passes into the chamber 34 located under the second channel 33. The vane surfaces 43 are oriented such that incident air flowing in the direction of arrow 45 passes through the slot 42 as shown by the continuation of arrow 45, while the vane surfaces 44 bring about the corresponding passage of incident air flowing in the opposite direction, causing it to pass through the slot as shown by arrow 46.

As shown in FIG. 4, the base 11 and the projections 32 of base 11 have bore holes 47 in them for insertion of the inlet and outlet tubes 48 of the channel (here only the hole 47 closest to the viewer is shown). In this connection hole 47 in projection 32 is provided with an elastic sealing collar 49. The free upper end of the second channel 33, which is the end distant from the connection 32, has a U configuration. The groove 50 formed by the U engages the free edge of the cover 12 of the first channel 2, and in this way the channel 33 is held in place. If the cover is, e.g., fixed to the projection 31 by screws in the region of the dot-dashed line 51, this arrangement serves at the same time to fix the second channel 33 in position.

As is seen in particular from FIG. 4, the underside of the base 11 is provided with an insulating lightweight foam layer 52, which preferably is comprised of a polyurethane material. The connecting tubes 53 which enable the coupling together of the respective heat transfer fluid channels 2 and 33 are accommodated in this foam layer 52. (Only the tube 53 for connecting the respective channels 2 and 33 closest to the viewer is shown in FIG. 4.) Behind projection 32 in another plane (generally parallel to the plane of the Figure) there is another projection with a bore hole for receiving the second connection to the second channel 33. This second connection communicates with the bent tube section 54. The ends of the connecting tube 53 and the end of the tube section 54 are sealably connected to the respective inlet/outlet tubes 48 of the channel 33 by means of a plug collar 55 for each such connection, which collar may be elastic.

The connecting tubes of the first (heat transfer) channel 2 (which are not shown) are analogously connected to external tubes (also not shown) which interconnect successive channels 2 of the first type.

Figure 6:
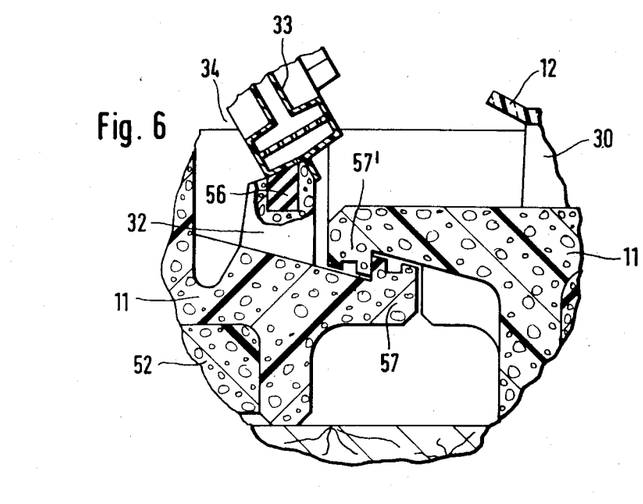
FIG. 6 is an enlarged detail view of the configuration of the ends of two successive collector elements.

FIG. 6 shows a second projection having a bore hole, at a distance from the projection 32 with bore hole 47 shown in FIG. 4. The second bore hole receives a stud 56 provided on the second channel 33, for fixing the second channel 33 in place. FIG. 6 also shows the simple interlocking configuration by which successive collector elements may be fastened together via their bases 11. In this the mating upper edge of the base 11 of each collector element 1 has an upwardly directed hook configuration 57 which engages a corresponding downwardly directed hook configuration 57' on the mating lower edge of the base 11 of the adjoining collector element.

Only one third of a collector element is shown in FIG. 4. Adjoining this on the left side there are corresponding additional frame regions of the base 11, namely first a region with an associated channel of the second (33) type, followed by a region of the first type which supports the channel of the first type over practically its entire length, and so on. The final frame region is configured in the manner shown in FIG. 6 of a downwardly directed hook configuration 57' for mechanical connection with the next (3-cell) collector element.

The collector element shown in FIG. 4 serves for mounting on a southerly roof with a pitch of basically less than 30°. In this case the heat transfer channels 2 are exposed to the optimum irradiation conditions. The damper 35 is closed. The second channel 33 which runs perpendicularly to the (first) heat transfer channel 2 is on the shady side. It stays in contact with the surrounding air and operates exclusively as an absorber. The heat transfer fluid which flows via the connecting tube 53 into the inlet tube 48 flows along underneath a separating wall 58 and passes through a series of openings in the separating wall 58. Toward the inlet side the openings are small, and toward the far end of the separating wall 58 (i.e., behind the plane of the Figure) their cross-section increases, so that the heat transfer fluid is distributed evenly over the fins of the channel 33. After passing through the fins and being collected in the upper chamber, the fluid passes through a return line to the outlet tube and thence to the connected tube section 54.

At low insolation, i.e. in bad weather or at night, the bar 36 causes the damper 35 to swing upward. Air which passes the projections 30 can then flow upward through chamber 15 over heat transfer channel 2 and further through the constriction formed by the damper, whence it enters the third chamber 34. In this mode, the heat transfer channel 2 operates similarly to second channel 33, in that it serves to remove heat from the surrounding air. The air which passes the constriction mixes with air in the third chamber 34, flows along the fins 41, where it gives up heat, and exits preferably in the region between the projections 32 (and to a lesser extent through the slots 42).

Figure 7:
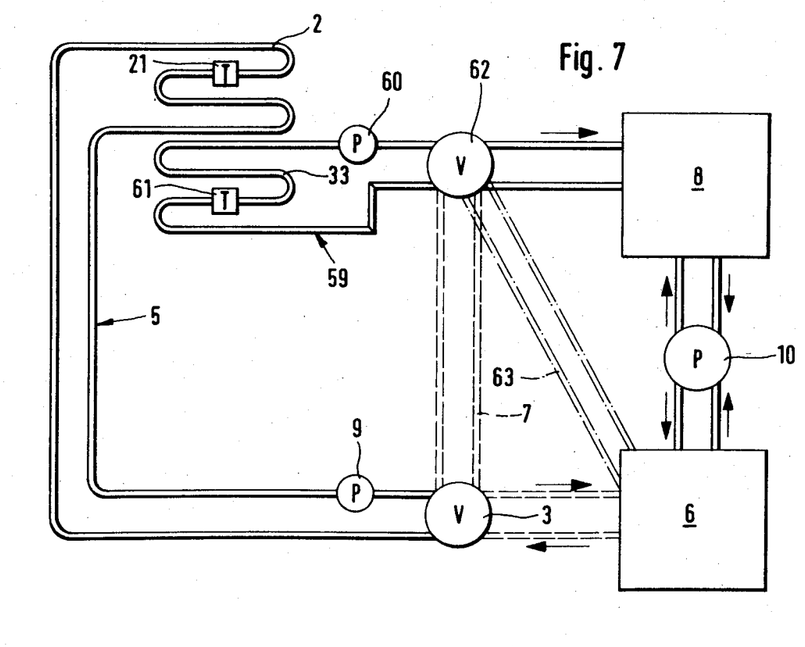
FIG. 7 is a schematic for illustrating the flow circulation, the mutual relationship of the heat transfer fluid channels, and the heat transfer fluid reservoirs which are connectable to said channels, when collector elements according to FIG. 4 are employed.

As seen in FIG. 7, in analogy with the arrangement of FIG. 1, the first heat transfer channel 2, which faces the sun, is connected during normal operation to the first branch 5, which contains the high temperature reservoir. The second heat transfer fluid channel 33, which faces in a direction perpendicular to the solar irradiation, is connected via second channel branch 59 to the low temperature reservoir 8, which is thermally connected to the high temperature reservoir 6 via a heat pump 10. This second channel branch 59 also contains a second circulation pump 60. Further, the second heat transfer fluid channel 33 has a fourth temperature sensor 61 associated with it. The second temperature sensor 21 communicates with first reversing valve 3 in the first branch 5 via control means not shown in FIG. 7. Likewise, the fourth temperature sensor 61 associated with second channel 33 communicates with the second circulation pump 60 in second channel branch 59 via control means not shown. The second branch 7 exiting from first reversing valve 3 serves to conduct the heat transfer fluid from heat transfer channel 2 to the low temperature reservoir 8 instead of to the high temperature reservoir 6, when the valves are set for such a switchover.

The arrangement shown in FIG. 7 enables the system to be operated in the following modes of operation: In normal operation, the heat transfer channel 2 is connected to the high temperature reservoir 6 via first branch 5 and first reversing valve 3, while the second channel 33 is connected to the low temperature reservoir 8 via second channel branch 59. If the weather conditions change and the temperature in the region of the heat transfer channel 2 falls below a predetermined value, e.g. 45° C., the control means associated with second temperature sensor 21 cause the first reversing valve 3 to shut off the connection from heat transfer channel 2 to the high temperature reservoir 6, and in place of said connection to open the second branch 7 leading to the low temperature reservoir 8.

The situation may arise in relatively cool weather and strong sunlight where the heat transfer channel 2 remains connected to the high temperature reservoir 6 (since the temperature in that channel is not less than 45° C.) while at the same time the temperature in second channel 33 remains at a value which is below the economically useful limit of, e.g., −5° C. In this case the second circulation pump 60 will simply be turned off, so as not to feed the low temperature reservoir 8 with heat transfer fluid at a temperature below the predetermined minimum temperature.

Only on extremely cold days without sunshine will the situation arise where both second temperature sensor 21 and fourth temperature sensor 61 will respectively cause heat transfer fluid circulation pump 9 and second circulation pump 60 to be turned off as a result of heat transfer channel 2 failing to reach the minimum temperature of −5° C. At such time it becomes advantageous to actuate the first reversing valve 3 to connect heat transfer channel 2 to the low temperature reservoir 8 via second branch 7.

In winter the situation may further arise where snow accumulates, not only on the second channel 33 but also on the cover 12. A sensor analogous to the sensor in automatic refrigerator defrosters may be employed to determine snow accumulation and, in combination with control means, to reverse the fluid circulation pump 9 so that it pumps heat transfer fluid back from the high temperature reservoir 6 via first reversing valve 3 into heat transfer channel 2, for a predetermined time interval, to defrost the cover 12. Alternatively, it is possible to reverse the second circulation pump 60 to pump heat transfer fluid from high temperature reservoir 6 into second channel 33 via first reversing valve 3 and second branch 7. In this case a reliable means of cutting off the low temperature reservoir 8 must be provided, e.g. a third reversing valve 62 inserted at the junction of second branch 7 and second channel branch 59. Alternatively, defrosting of second channel 33 may be accomplished by directly connecting heat transfer channel 2 and second channel 33 via first reversing valve 3 and third reversing valve 62; i.e., by short circuiting first branch 5 and second channel branch 59 via second branch 7, bypassing reservoirs 6 and/or 8.

For a situation in summer in which temperatures in heat transfer channel 2 approach boiling (when the ambient temperature is very high and the sunlight is very strong), the inclusion of a third reversing valve 62 makes it possible to counter any threat of overheating of heat transfer channel 2 with the attendant danger of substantial pressure increases. This countering may be accomplished by reversing fluid circulation pump 9 by means of a control element working in connection with the second temperature sensor 21, and simultaneously connecting low temperature reservoir 8 to heat transfer channel 2 by means of third and first reversing valves 62 and 3, respectively. These steps are employed to achieve a temporary cooling of heat transfer channel 2 with lower temperature heat transfer fluid.

If the temperature in the high temperature reservoir 6 should approach the boiling point to a hazardous degree, the second channel 33 may also be cut off from the low temperature reservoir and be directly connected to the high temperature reservoir 6 via the third reversing valve 62 and an additional (third) branch 63. The overheated heat transfer fluid is then passed through second channel 33 with the air of the second circulation pump 60, and is cooled until the temperature in high temperature reservoir 6 is reduced to a normal, safe level.

I claim:

1. In a dual mode device for converting solar energy into heat, comprising a solar collector having a plurality of collector elements mounted on a support surface, coupled together, and connected to a heat transfer fluid circuit containing a circulating heat transfer fluid, each of which collector elements is comprised of a first heat transfer fluid channel which faces the sun and is associated with a heat transfer fluid circulation pump, and each of which collector elements has a second channel which is oriented perpendicularly to the first channel and is in contact with the surrounding air, and wherein: (1) in a first operating mode of said first channel in which it operates as a collector, said first channel is connected to a first branch containing a high temperature reservoir; and (2) in a second operating mode of said first channel, in which it operates as an absorber, said first channel is cut off from the first branch by means of a controlled reversing valve when the temperature of the circulating heat transfer fluid is less than a predetermined minimum temperature, as measured by means of a temperature sensor, and is connected to a second branch containing a low temperature reservoir; the improvement comprising a chamber disposed about the upper side of the first channel, which faces the sun below a light-transmitting cover, said chamber having an air inlet and air outlet means providing contact between said chamber and the surrounding air only when the temperature in the chamber is less than a predetermined value.

2. The device of claim 1 further comprising a damper which is connected to a temperature sensitive control element associated with the first channel, which damper controls the flow area between the first channel and the cover as a function of temperature.

3. The device of claim 2 further comprising an uncovered second channel oriented perpendicularly to the first channel which operates as an absorber, connected to a second channel branch (which second branch contains the low temperature reservoir), and provided with a plurality of fins which run in the flow direction of the heat transfer fluid and with slots which run parallel to the fins and which provide a communication path between a third (absorber) chamber located at the underside of the second channel and the surrounding air.

4. The device of claim 3 further comprising a bend in the cover of the chamber toward the second channel, so that when the damper is open the chamber which is bounded by said cover communicates with a third chamber below the second channel.

5. The device of claim 2 wherein the chamber is closed at its upper end, wherein said air inlet and air outlet means comprises two slots for air exchange, the lower end of said chamber, a first slot more distant from the first channel and a second slot close to said first channel; and a control device associated with the heat transfer fluid circulation pump which causes the transportation of the heat transfer fluid from the first channel to the high temperature reservoir in the collector operating mode or the low temperature reservoir in the absorber operating mode, depending on the external temperature and the intensity of the radiant energy incident on the first channel, said control device further causing the heat transfer fluid circulation pump to stop temporarily during the transition from the absorber operating mode to the collector operating mode.

6. The device of claim 5 wherein the control device has means for measuring temperature and means for measuring intensity of incident radiation and means for converting the values from the measurement of the external temperature and the measurement of the intensity of the radiant energy incident on the first channel to electrical signals of an appropriate magnitude, sums said signals, and when the signal sum exceeds a predetermined level turns off the circulation pump until the difference between the measurement signal from a second temperature sensor associated with the first channel (or a group of interconnected channels) and that from a third temperature sensor disposed in the high temperature reservoir exceeds a predetermined value, whereupon the control device causes the heat transfer fluid flow to shift from the second branch to the first branch containing the high temperature reservoir, by means of reversing control valves disposed on the inlet and outlet sides, respectively, of the channel circulation loop, and when the signal sum of electrical signals corresponding to the external temperature and the incident radiant energy falls below a predetermined signal level, the control device causes the reversing control valves to switch back to pass the heat transfer fluid flow through the second branch containing the low temperature reservoir.

7. The device of claim 1 further comprising a plastic base which supports the first channel, and a shallow secondary chamber between the first channel and the base, which secondary chamber during operation in the absorber mode promotes heat exchange by means of increased air circulation, and opens out at its lower end into the second slot which is near to the first channel.

8. The device of claim 7 wherein the transparent cover comprises an inner cover sheet and an outer cover sheet which are spaced generally parallel to each other, and which form the boundaries of a closed space.

9. The device of claim 7 wherein the transparent cover is comprised of an inner cover sheet and an outer cover sheet which are spaced generally parallel to each other, and wherein the lower edges of said sheets form the boundary of the first slot which is more distant from the first channel, and whose upper sides form an opennng which opens out into the chamber.

10. The device of claim 1 further comprising an uncovered second channel oriented perpendicularly to the first channel which operates as an absorber, connected to a second channel branch (which second branch contains the low temperature reservoir), and provided with a plurality of fins which run in the flow direction of the heat transfer fluid and with slots which run parallel to the fins and which provide a communication path between a third (absorber) chamber located at the underside of the second channel and the surrounding air.

11. The device of claim 1 further comprising that the chamber is closed at its upper end, and wherein said air inlet and air outlet means is comprised of two slots for air exchange at the lower end of said chamber, a first slot more distant from the first channel and a second slot close to said first channel; and wherein a control device associated with the heat transfer fluid circulation pump causes the transportation of the heat transfer fluid from the first channel to the high temperature reservoir in the collector operating mode or the low temperature reservoir in the absorber operating mode, depending on the external temperature and the intensity of the radiant energy incident on the first channel, and said control device further causes the heat transfer fluid circulation pump to stop temporarily during the transition from the absorber operating mode to the collector operating mode.

12. The device of claim 5 further comprising a plastic base which supports the first channel, and a shallow secondary chamber between the first channel and the base, which secondary chamber during operation in the absorber mode promotes heat exchange by means of increased air circulation, and opens out at its lower end into the second slot which is near to the first channel.

13. The device of claim 5 wherein the transparent cover comprises an inner cover sheet and an outer cover sheet which are spaced generally parallel to each other, and which form the boundaries of a closed space.

14. The device of claim 5 wherein the transparent cover is comprised of an inner cover sheet and an outer cover sheet which are spaced generally parallel to each other, and wherein the lower edges of said sheets form the boundary of the first slot which is more distant from the first channel, and whose upper sides form an opening which opens out into the chamber.

15. The device of claim 6 further comprising a plastic base which supports the first channel, and a shallow secondary chamber between the first channel and the base, which secondary chamber during operation in the absorber mode promotes heat exchange by means of increased air circulation, and opens out at its lower end into the second slot which is near to the first channel.

16. The device of claim 6 wherein the transparent cover comprises an inner cover sheet and an outer cover sheet which are spaced generally parallel to each other, and which form the boundaries of a closed space.

17. The device of claim 6 wherein the transparent cover is comprised of an inner cover sheet and an outer cover sheet which are spaced generally parallel to each other, and wherein the lower edges of said sheets form the boundary of the first slot which is more distant from the first channel, and whose upper sides form an opening which opens out into the chamber.

18. The device of claim 1 wherein the transparent cover comprises an inner cover sheet and an outer cover sheet which are spaced generally parallel to each other, and which form the boundaries of a closed space.

19. The device of claim 1 wherein the transparent cover is comprised of an inner cover sheet and an outer cover sheet which are spaced generally parallel to each other, and wherein the lower edges of said sheets form the boundary of the first slot which is more distant from the first channel, and whose upper sides form an opening which opens out into the chamber.

* * * * *